United States Patent [19]

Epple

[11] 3,776,758

[45] Dec. 4, 1973

[54] POLYMERIC FLEXOGRAPHIC INK

[75] Inventor: Donald G. Epple, Oak Lawn, Ill.

[73] Assignee: Nalco Chemical Company, Chicago, Ill.

[22] Filed: Oct. 18, 1971

[21] Appl. No.: 190,028

[52] U.S. Cl............... 117/38, 117/12, 117/15, 117/132 CB, 117/155 UA, 117/161 UT, 260/297 W, 260/297 T, 260/33.4 R, 260/80.7, 260/887, 260/901
[51] Int. Cl............................................. B41m 1/00
[58] Field of Search........... 117/12, 15, 38, 155 UA, 117/161 UT, 132 CB; 260/29.7 D, 29.7 W, 29.7 T, 88.1 R, DIG. 38, 887, 901, 33.4 R, 80.7

[56] References Cited
UNITED STATES PATENTS

| | | | |
|---|---|---|---|
| 3,281,267 | 10/1966 | Rice | 260/887 X |
| 2,413,259 | 12/1946 | Soday | 260/DIG. 38 |
| 2,719,832 | 10/1955 | Craemer et al. | 260/DIG. 38 |
| 2,643,958 | 6/1953 | Kleiner et al. | 260/DIG. 38 |
| 2,810,716 | 10/1957 | Markus | 260/88.1 |
| 3,151,993 | 10/1964 | Bandy | 260/DIG. 38 |

OTHER PUBLICATIONS

Kirkothmer Encyclopedia of Chemical Technology, 2nd ed., Vol. 11, 1966, pp. 626–627, TP9E68, 1963.

Primary Examiner—Murray Katz
Assistant Examiner—M. R. Lusignan
Attorney—John G. Premo et al.

[57] ABSTRACT

A rapid drying flexographic ink consisting of:

a. about 40 percent by weight of an inorganic pigment;

b. 40 – 45 percent by weight of a polymer solution/emulsion consisting of a styrene/butadiene/acrolein/acrylic acid (SBAA) tetrapolymer (30 – 40 percent by weight solids) containing as a predispersant additive 5 – 15 percent by weight of a polyacrylate; and c. the balance inert diluent selected from the group consisting of water and lower alkanols.

4 Claims, No Drawings

POLYMERIC FLEXOGRAPHIC INK

The present invention relates to a novel polymeric ink suitable for flexographic printing processes. Flexography is a type of relief printing where the printing area is raised above the non-printing area and the ink is applied to the raised surface. In flexography, a flexible type rubber plate is mounted on a cylinder and fast-dry fluid inks of the lacquer type are utilized. A pressing commercial advantage in flexography lies in the ability of the process to deal a non-pressure kiss impression from the flexible rubber plate enabling finishing of hard surfaces such as plastics, films, calendared papers, and metallic foils. The key to the flexographic processes lies in the ink utilized, and thus the formulation is particularly critical. A synopsis of the flexographic processes and attendant inks is described in the Encyclopedia of Polymer Technology, 11, 565 (1969) and in E.A.Apps, Printing Ink Technology, Leonard Hill [Books], Ltd., London (1958), Chapter 24, pages 391–399.

PRIOR ART

Related prior patent art believed to be of interest is as follows:

The Polymeric Composition

U.S. Pat. No. 2,498,712 — Ryden (Dow) — Styrene, butadiene, and methyl methacrylate U.S. Pat. No. 2,651,624 — Swart (General Tire) — Butadieneacrolein polymer U.S. Pat. No. 3,142,654 — Peterson, et al.(Ashland Oil) — Butadiene styrene acrylate latex terpolymer U.S. Pat. No. 3,231,538 — Tsatsos (Shell) — Acrolein terpolymer which may include butadiene and acrylate as at column 2

Canadian Pat. No. 740,498 — Vitkuske (Dow) — Teaches the terpolymer of styrene, butadiene and acrylic acid The Pigment Compositions and Flexographic Inks U.S. Pat. No. 3,095,320 — Leitner (Geigy) — Teaches pigment compositions including styrene butadiene type, including a soft polymer consisting of methacrylic acid, butadiene, and styrene at column 4

U.S. Pat. No. 3,472,802 — Bownes, et al.(Interchemical Corp.) — A flexographic printing ink comprising a polymer functionality of an isocyanate reactant or polyurethane.

In contrast, the polymer or resin-base composition of the present invention contemplates a tetrapolymer wherein a basic styrene/butadiene is modified by the inclusion of both acrolein and acrylic acid and as an additive to precoat the pigment, there is added 5 – 10 percent of a polyacrylate derived from lower alkyl ester monomers.

The present ink formulation includes an inorganic pigment and water or lower alkanol is used as a diluent or dispersing agent.

As compared with the prior art above, the essential point of novelty presently lies in the use in the ink of the polymer formulation of the tetrapolymer and acrylic modifier, which is formulated from monomeric reactants according to the chart shown below.

Formulation of Tetrapolymer

|  | Preferred Formulation % | Intermediate Formulation % | Broad Formulation % |
| --- | --- | --- | --- |
| Styrene | 60 | 45–75 | 45–90 |
| Butadiene | 29 | 15–45 | 0–45 |
| Acrolein | 10 | 5–15 | 5–20 |
| Acrylic Acid | 1 | 1–2 | 1–2 |

Preferred ink formulation is as follows:
40 percent inorganic pigment
40–45 percent polymer of which 30-40 percent is tetrapolymer solution/emulsion and 15-5 percent is polyacrylate disperant
20–15 percent diluent (water or lower alkanol)

PREPARATION OF THE TETRAPOLYMER

The tetrapolymer may be conveniently prepared by mixing the acrylic acid reactant, styrene in the presence of an oil-in-water emulsifier (e.g., Monawet MM80—Mona Chemicals) under nitrogen blanket to form an emulsion with the styrene. Preferentially the acrolein and then butadiene are added to the mix, with the butadiene in gas form. A redox catalyst is utilized using the combination $t$-butyl hydroperoxide and sodium metabisulfite under mild heat and pressure (104° – 167° F. at 20–24 psig for about 4 hours) and then using atmospheric pressure under nitrogen blanket at reflux (200° – 210° F.) for an additional two hours.

Following this procedure, unreacted monomer is stripped by a vacuum at about 170° F. and for about 3 hours. The reactor is cooled to about 76° F., and the emulsion is discharged from the reactor, filtered, and recovered. A liquid product is obtained which contains about 35 percent solids (moisture balance) and shows a Brookfield viscosity at 77° F. at about 7.5 centipoise.

On a mol weight basis the tetrapolymer had a molecular weight basis from about 10,000 to about two million as determined by the light scattering technique, and in a majority of cases the average molecular weight was one million ± 200,000. Additionally, the particle size of the polymers was found to range from about $0.05 - 0.2\mu$. The color of the tetrapolymer as produced was white to a pearly off-white. In the polymerization reaction leading to the formation of the tetrapolymer, certain conventional procedures may be utilized. For example, a variety of different methods may be utilized, and with respect to the redox catalyst, there is incorporated by reference the material in U.S. Pat. No. 3,231,538 Tsatsos (Shell) reading from column 3, line 17, to column 4, line 3, as to the variation of a free radical catalyst and redox agent in an aqueous system. Variations in operable pairs are described in U.S. Pat. No. 3,231,538 Tsatsos (Shell) in column 3, line 17, to column 4, line 3. Additionally, the utilization of alternative surfactants for controlling rate of polymerization is described in the above patent to Tsatsos at column 4, line 4, to column 5, line 2, and this material is incorporated as operable in the present invention.

Preferred weight percentages for reactant monomers are set out in the chart above, and it was noted that an increase in styrene or acrolein tends to increase the hardness properties of the tetrapolymer. Additionally, raising the starting value for the butadiene monomer tends to decrease hardening propertires.

For utilization in a flexographic ink formulation, it is advantageous to utilize high molecular weight polyacrylate, such as $n$-butyl, ethyl, hexyl, 2-ethyl hexyl, methyl, etc. The lower alkyl moiety may be selected from $C_1 - C_6$, inclusive, and the polyacrylate additive serves to coat the particles of the pigment to avoid agglomeration difficulties upon later addition of the tetrapolymer. The polyacrylate is added in the amount of about 5 – 15 percent by weight of the total formulation and the preferred weight percent is about 12 percent.

Especially commercially utilizable polyacrylates include Joncryl 60 (S. C. Johnson) and Aquahyde 100 (Lawter Chemical).

FORMULATION OF THE FLEXOGRAPHIC INK

In general the selected pigment is predispersed in the polyacrylate additive; e.g., Joncryl 60, together with diluent which may be water or lower alkanol, such as isopropanol. To this dispersion is added the tetrapolymer formulation, and a quick-drying flexographic ink is obtained with good qualities of wet rub, dry rub, drying time, and gloss. A preferred formulation for an ink of this invention is as follows:

- 40 g chrome yellow pigment (Y469D – E.I.duPont)
- 12 g polyacrylate 20 wt. percent polymer solids (Joncryl 60)
- 32 g tetrapolymer emulsion 35 wt. percent polymer solids
- 10 g water
- 6 g isopropanol

THE PIGMENT

Pigments with which the present dispersions or solutions may be employed are any of those conventionally employed for ink compositions, such as titanium dioxide, white lead, lithopone, barytes, blanc fixe, zinc oxide, alumina hydrate, chalk, mica, silica, magnesium carbonate, ultramarine, bronze blue, iron blue, ferrocyanide blue, lead chrome, red lead, orange basic chrome, zinc chrome, zinc yellow, cadmium pigments, vermilion, Brunswick green, Milori green, Guignet's green, iron oxide pigments, etc. A preferred formulation utilizes as a pigment chrome yellow, a lead chromate type inorganic pigment.

THE DILUENT

Flexographic inks depend upon a quick drying diluent. It has been found that water or a lower alkanol best satisfies this criteria and, of the alkanols, ethanol and isopropanol are preferred. Further, it has been found that isopropanol is the diluent of choice and conventionally it is used in conjunction with water for an isopropanol/water mixture. Excluding the liquid normally present in the tetrapolymer and the polyacrylate additive, the diluent represents 20 – 15 percent by weight of the total formulation or charge.

The diluent and the tetrapolymer, when added to the dispersed pigment, are known in the art as the "let down." The present process envisages a predispersion of the pigment in the polyacrylate followed by addition of the tetrapolymer and diluent to redisperse and provide an ink vehicle. The ink formulations of the present invention result in a good gloss in that the receptive layer will allow the ink to form a continuous film on the surface and this is accomplished by good wetting of the pigment. In the present flexographic ink, good gloss is accomplished in part by the high volatility of the water or lower alkanol diluent utilized to accomplish solvent release by evaporation. Wet rub and dry rub factors are defined by comparative rub resistance in a wet or dry state or resistance to removal of the ink from the base.

Comparative flexographic inks known in the prior art and their formulations are summarized in E.A.Apps, Printing Ink Technology, Leonard Hill [Books], Ltd., London (1958), Chapter 24, pages 391-399.

EXAMPLE 1

- Soft Water — 97.0 lbs.
- Monawet MM80 emulsifier (Mona Industries,Inc.; succenic acid ester) — 1.41 lbs.
- Acrylic acid, R-779 — 0.50 lbs.
- Styrene, R-638 — 29.7 lbs.
- Acrolein, 100 ppm Hydroquinone — 5.0 lbs.
- Butadiene, Matheson C.P. — 14.8 lbs.
- $t$-butylhydroperoxide-90 — 0.125 lbs.
- Sodium metabisulfite — 0.25 lbs.
- Soft water — 0.75 lbs.

Procedure. The water was charged to a reactor and the emulsifier Monawet MM80 and the acrylic acid were added. Agitation was maintained equivalent to 1,500 rpm for a 3-inch diameter prop. Styrene was then added to the reactor and the temperature of the emulsion was cooled to below 68° F. The emulsion was sparged with nitrogen at 4 ft$^3$/min. for about 1/2 hour and thereafter a blanket of nitrogen was maintained over the reactor.

Acrolein was charged into the reactor through a dip tube under the surface of the emulsion and then the reactor outlet was sealed and butadiene was charged as a gas. Reactor pressure was maintained to a value between 13 psig and 19 psig by controlling the temperature in the range of 50° to 68° F. by cooling. The redox was then added incrementally, adding $t$-butyl hydroperoxide and then sodium metabisulfite. The reactor was then heated to about 104° F. for about 15 min. and the pressure in the reactor was noted to rise to about 30 – 35 psig. The polymerization temperature was held at 104° to 113° F. with cooling water for 1-2 hours until it was noted the reactor pressure had dropped to 20-25 psig. At the end of this time interval, the reaction was allowed to heat to 158° F. for 1 hour and this temperature was maintained with steam heating when necessary. The reactor pressure was observed to be in the range of 35-40 psig during this time period. The temperature 158°– 167° F. was maintained for 2 additional hours, then the reactor was vented, and unreacted butadiene and the reactor was refluxed under steam to about 203° F. for 2 hours, followed by vacuum stripping of unreacted monomer for 3 hours, which time was controlled due to the time control to prevent emulsion foaming. The emulsion was cooled to 76° F., discharged from the reactor, filtered, and recovered.

Analysis
- Total Solids (moisture balance) — 35 percent
- Brookfield viscosity at 77° F. — 7.5 centipoise
- Odor (Acrolein) — Slight
- m.w. — > 10,000

The embodiments of this invention to which an exclusive property or privilege is claimed are defined as follows:

1. A method of treating a receptive printing base which comprises applying to said base by a relief flexographic printing process an ink composition consisting of a quick-drying polymeric formulation comprising a major portion of a styrene/butadiene/acrolein/acrylic acid polymer emulsion wherein the reactant formulations by weight, respectively, of the components are:
- Styrene — 45–90 percent
- Butadiene — up to 45 percent
- Acrolein — 5–20 percent
- Acrylic Acid — 1–2 percent and modified with a minor proportion of a polyacrylate derived from lower alkyl acrylate monomers and inorganic pigment, together with a diluent selected from the group consisting of water and lower alkanol and allowing said ink to dry.

2. The process according to claim 1 wherein the SBAA polymer, the reactant formulations by weight, respectively, of the components are:

Styrene — 45–75 percent
Butadiene — 15–45 percent
Acrolein — 5–15 percent
Acrylic Acid — 1–2 percent 3. The process according to claim 1 wherein the SBAA polymer, the reactant formulations by weight, respectively, of the components are about:

Styrene — 60 percent
Butadiene — 29 percent
Acrolein — 10 percent
Acrylic Acid — 1 percent 4. The process according to claim 1 wherein the diluent is selected from water and isopropanol.

* * * * *